United States Patent
Strasser et al.

(10) Patent No.: US 9,206,882 B2
(45) Date of Patent: Dec. 8, 2015

(54) WIND POWER PLANT, HAVING COUPLING MEANS ARRANGED BETWEEN THE PLANETARY TRANSMISSION AND THE GENERATOR FOR THE PURPOSE OF COMPENSATING AXIAL, RADIAL AND ANGULAR MISALIGNMENT

(71) Applicant: Robert Bosch GmbH, Stuttgart (DE)

(72) Inventors: Dirk Strasser, Breckerfeld (DE); Christian Lohmann, Witten (DE)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 13/916,688

(22) Filed: Jun. 13, 2013

(65) Prior Publication Data
US 2013/0337969 A1    Dec. 19, 2013

(30) Foreign Application Priority Data
Jun. 18, 2012    (DE) .......................... 10 2012 012 106

(51) Int. Cl.
*F16H 1/48* (2006.01)
*F03D 11/02* (2006.01)

(52) U.S. Cl.
CPC *F16H 1/48* (2013.01); *F03D 11/02* (2013.01); *F05B 2260/40311* (2013.01); *Y02E 10/722* (2013.01)

(58) Field of Classification Search
CPC ......... F03D 11/02; F16H 1/48; Y02E 10/722; F05B 2260/40311
USPC .................................................. 475/346, 347
See application file for complete search history.

(56) References Cited

U.S. PATENT DOCUMENTS

| | | | | |
|---|---|---|---|---|
| 6,176,804 | B1 * | 1/2001 | Kekki et al. ................... | 475/331 |
| 7,753,817 | B2 * | 7/2010 | Ryymin et al. ................ | 475/150 |
| 8,075,442 | B2 | 12/2011 | Ciszak et al. | |
| 9,041,237 | B2 * | 5/2015 | Hinken ........................... | 290/55 |
| 2013/0302144 | A1 * | 11/2013 | Demtroder et al. ......... | 415/124.2 |

FOREIGN PATENT DOCUMENTS

DE    10 2006 051 546 A1    5/2008

\* cited by examiner

*Primary Examiner* — Sherry Estremsky
(74) *Attorney, Agent, or Firm* — Maginot, Moore & Beck LLP

(57) ABSTRACT

A wind power plant has a rotor, an integrated medium-speed electric generator, and a planetary transmission. The planetary transmission is arranged to convert a slow rotary motion of the rotor into a rapid rotary motion to operate the generator. The planetary transmission includes a transmission input shaft connected indirectly to the rotor and includes a transmission output shaft connected to the generator indirectly via a generator shaft. A coupling mechanism is arranged between the generator shaft and the planetary transmission to compensate axial, radial and angular misalignment.

10 Claims, 4 Drawing Sheets

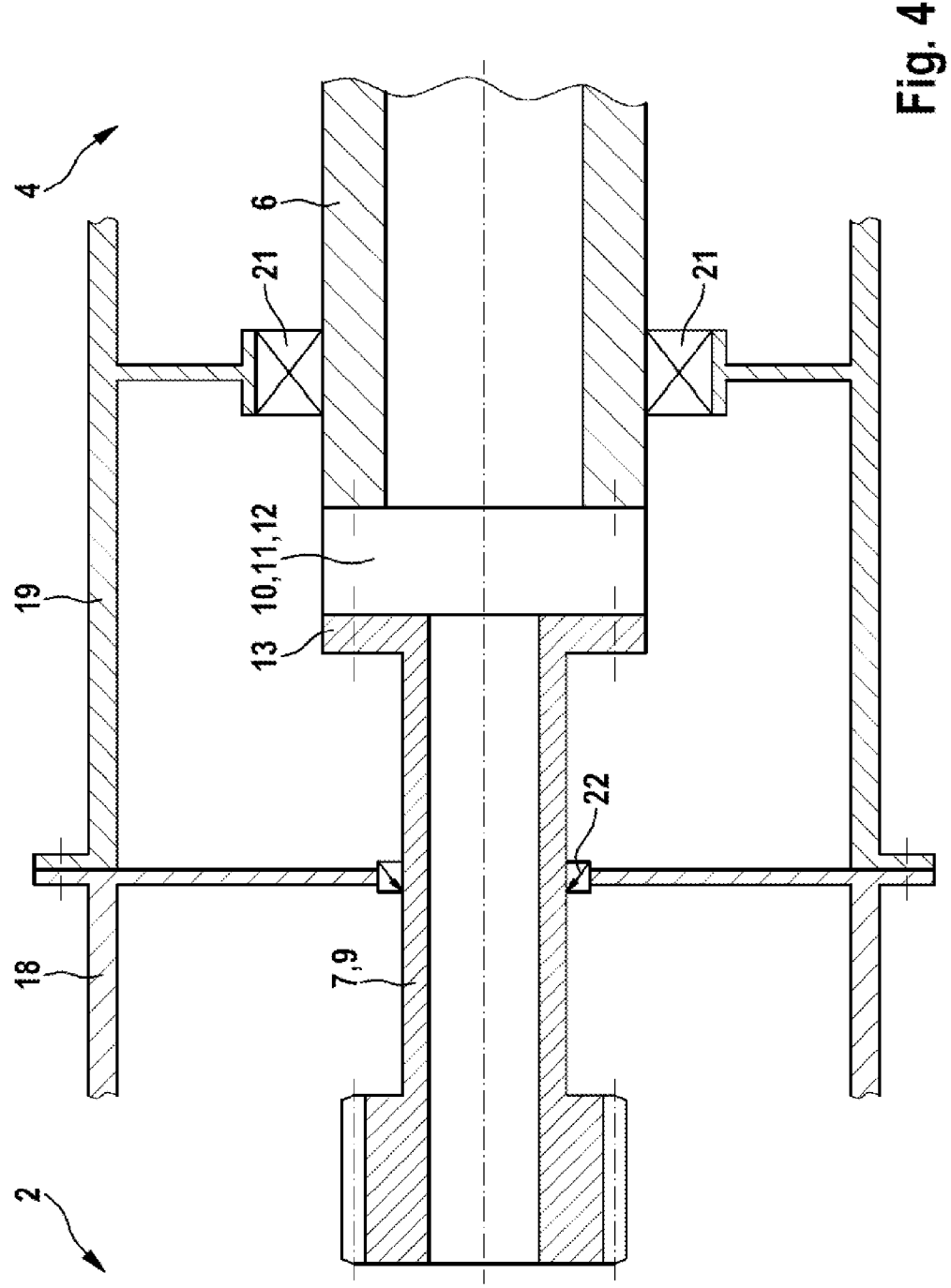

WIND POWER PLANT, HAVING COUPLING MEANS ARRANGED BETWEEN THE PLANETARY TRANSMISSION AND THE GENERATOR FOR THE PURPOSE OF COMPENSATING AXIAL, RADIAL AND ANGULAR MISALIGNMENT

This application claims priority under 35 U.S.C. §119 to patent application no. DE 10 2012 012 106.7, filed on Jun. 18, 2012 in Germany, the disclosure of which is incorporated herein by reference in its entirety.

BACKGROUND

The present disclosure relates to a wind power plant, having a planetary transmission, which is arranged for the purpose of converting a slow rotary motion of a rotor into a rapid rotary motion for operating an integrated medium-speed electric generator, comprising a transmission input shaft, which is connected indirectly to the rotor, and a transmission output shaft, which is connected to the generator indirectly via a generator shaft, wherein a coupling means is arranged between the generator and the planetary transmission.

The area of application of the disclosure extends to planetary transmissions of the kind encountered in the drive train of a wind power plant. Among the important features of such planetary transmissions are the dimensions and the weight. At the same time, important factors in the configuration of the transmission components are, not only the choice of materials and structural aspects, but also the prevailing forces and torques acting on the planetary transmission. Planetary transmissions of this kind are subject to extraordinary stresses due to the location at which they are installed and to the nonuniform changes in the load population.

DE 10 2006 051 546 A1 includes a wind energy plant having a twin-feed asynchronous generator, wherein a coupling is provided between the asynchronous generator and a transmission. This coupling serves to separate the generator mechanically from the drive train, ensuring that the transmission and the asynchronous generator are decoupled from one another during a phase shifter mode. The effective power required to maintain the rotational speed corresponds simply to the losses in the generator and the converter.

The generally known prior art discloses that, in the modularized version of the drive train, the transmission, which is generally a multi-stage planetary transmission with spur wheel stages, and the generator are mounted separately from one another and each one has a dedicated housing. The output shaft of the transmission and the output shaft of the high-speed generator are connected by an intermediate shaft. Medium-speed drive trains with a small number of spur wheel stages are already known from the prior art. If only planetary stages are used, the sun wheel shaft of the planetary stage on the generator side can be used as a shaft for connection to the generator.

U.S. Pat. No. 8,075,442 B2 discloses a planetary transmission for converting a slow rotary motion of a rotor into a rapid rotary motion for operating an integrated medium-speed electric generator. The transmission and the generator are arranged coaxially and have joint support for the transmission output shaft and the generator input shaft. A coupling in radial alignment with the bearing is arranged between the generator and the transmission. Moreover, the forces produced by the rotor and the generator and acting on the abovementioned bearing are less than the static and dynamic torques due to the gearing. It would be more advantageous to avoid a joint bearing for the coaxial output shaft and the generator shaft.

Moreover, it is known from the generally known prior art that the primary aim in the case of medium-speed transmissions with a directly flanged-on generator is to reduce the overall length to a minimum. The housing of the transmission can simultaneously form the housing of the generator, and the transmission and the generator are therefore flanged to one another. This configuration is so compact that the output shaft of the transmission usually drives the generator directly. Since axial and radial misalignment and angular positioning errors can occur in the integrated drive train between the transmission and the generator, possible sources being production and assembly tolerances and also imbalances and load-dependent deformations, it is worthwhile to compensate these in order as far as possible to transmit only the torque.

It is therefore the object of the present disclosure to provide a wind power plant, in particular the drive train of a wind power plant, comprising a planetary transmission and an integrated medium-speed electric generator, which compensates forces and torques caused by axial, radial and angular misalignment in order to transmit only the torque.

SUMMARY

Starting from a wind power plant in accordance with the description below, the object is achieved in conjunction with the characterizing features thereof.

Advantageous developments of the disclosure will become apparent from the following description.

According to the disclosure, the coupling means is arranged for the purpose of compensating axial, radial and angular misalignment between the planetary transmission and the generator shaft. An arrangement of this kind in conjunction with a suitable coupling means effectively compensates forces and torques caused by axial, radial and angular misalignment, with the result that only the torque from the planetary transmission to the generator is transmitted. Owing to the smaller population of forces acting on the generator, this allows a corresponding weight-optimized configuration of the generator.

According to a preferred embodiment, the coupling means is a transmission output shaft arranged between a generator shaft and a sun wheel of the planetary transmission and provided with double universal-joint support. Here, the sun wheel serves as articulation points on the transmission side, and the generator shaft serves as an articulation point on the generator side. The double universal-joint support for the transmission output shaft allows compensation of axial, radial and angular misalignment between the planetary transmission and the generator.

According to a second preferred embodiment, the coupling means is a transmission output shaft arranged between the planetary transmission and the generator shaft, configured as a sun wheel shaft and provided with universal-joint support on the generator side. In order, as above, to compensate axial, radial and angular misalignment between the planetary transmission and the generator, the transmission output shaft should have an appropriate length. The length of the transmission output shaft preferably corresponds to at least twice a diameter of the transmission output shaft. Given an appropriate length, the radial misalignment can then be compensated by the angular misalignment, and the axial misalignment can be compensated by the universal-joint support.

According to a third preferred embodiment, on the generator side, the coupling means is arranged on a transmission output shaft with transmission-side gearing, which is arranged between the planetary transmission and the generator shaft and is configured as a sun wheel shaft. An embodiment of this kind allows a solution which saves installation space and shortens the drive train. The generator-side coupling means preferably comprises at least one double-jointed coupling, at least one torsionally stiff toothed coupling and/or at least one torsionally and flexurally elastic link-type coupling. To compensate axial, radial and angular misalignment between the planetary transmission and the generator, either one coupling means or a plurality of coupling means can be connected in series. A combination of the abovementioned coupling means is likewise conceivable.

It is furthermore proposed that the generator-side coupling means is flanged to the sun wheel shaft, wherein a positive or nonpositive joint is provided between the flanged-on coupling means and the sun wheel shaft. In this way, it is possible, for example, to bring the axial end face of the sun wheel shaft and the axial end face of the coupling means into contact in order then to connect positively using connecting means, in particular screw or bolt elements.

In the case of the nonpositive joint between the flanged-on coupling means and the sun wheel shaft, means that increase the friction coefficient are preferably provided axially on the end faces of the joints. The friction coefficient at the said locations is thereby increased and the nonpositive engagement is enhanced. Particularly suitable means for increasing the friction coefficient are films that increase the friction coefficient and coatings that increase the friction coefficient, these generally containing hard particles which, when the two end faces are pressed together, partially penetrate into the end faces and produce positive engagement at the micro level.

According to a measure which further improves the embodiments described herein, it is proposed that a generator-side coupling flange is forged on the sun wheel shaft. Although forging the coupling flange directly on the sun wheel shaft or forming that end of the spur wheel shaft which faces the generator to give a flange requires a coupling means specially adapted to this purpose, it ensures an improved possibility of connection between the sun wheel shaft and the coupling means.

It is furthermore proposed that a coupling means that requires lubrication can be supplied with transmission oil for lubrication and cooling, wherein the coupling means that requires lubrication is sealed off in an oil-tight manner from the generator by a seal element. If the coupling means does not require any lubrication, sealing off the generator from the transmission by means of the seal element is advantageous.

The disclosure includes the technical teaching that the coupling means has a current-insulating effect, or at least has means that have a current-insulating effect. Suitable materials include ceramic and polymer elements, in particular, however, glass fiber and carbon elements. Accordingly, the screw joint can have current-insulating bushes and/or current-insulating washers. Moreover, a current-insulating intermediate shaft, in particular an output shaft provided with double universal-joint support, made from said materials is conceivable.

BRIEF DESCRIPTION OF THE DRAWINGS

Further measures that improve the disclosure are explained in detail below together with the description of a preferred illustrative embodiment of the disclosure, by means of the figures, in which:

FIG. 4 shows a schematic longitudinal section through the coupling means according to the disclosure in accordance with a third embodiment, wherein the transmission output shaft is a sun wheel shaft with a coupling means on the generator side.

DETAILED DESCRIPTION

Figure 1:
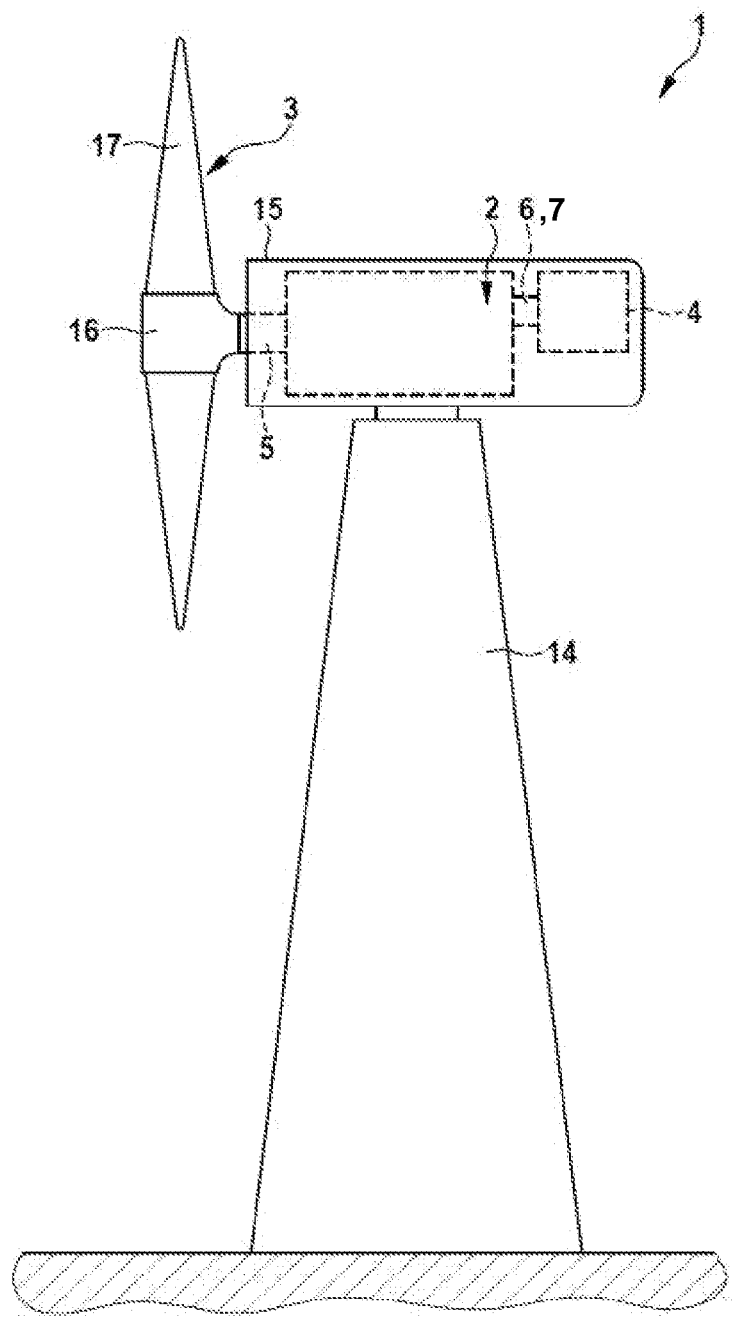
FIG. 1 shows a schematic side view of a wind power plant.

FIG. 1 shows a side view of a wind power plant 1 with the essential subassemblies thereof. The wind power plant 1 has a tower 14, on which a pod 15 in the form of a machine housing mounted so as to be rotatable about a vertical axis is arranged. Secured against relative rotation in the pod 15 is a planetary transmission 2, which has a transmission input shaft 5 and a transmission output shaft 7. The transmission input shaft 5 is connected to a hub 16 of a rotor 3 having a plurality of rotor blades 17. The transmission output shaft 7 is connected in terms of rotation to a drive device to be driven, in the form of a generator 4.

The planetary transmission 2 is configured in such a way that it converts a slow rotary motion of the transmission input shaft 5 into a rapid rotary motion of the transmission output shaft 7. For this purpose, the planetary transmission 2 has two or more planet wheel stages, which interact with the transmission output shaft 7 via a final spur wheel transmission. By means of the wind power plant 1, electric energy is produced by a process in which the rotor 3, to which a rotary motion is imparted by the wind, introduces the rotary motion on the transmission input shaft 5 into the planetary transmission 2. The planetary transmission 2 converts the rotary motion into a faster rotary motion and, finally, the rapid rotary motion is transmitted via the transmission output shaft 7 to the generator 4 in order to produce current.

Figure 2:
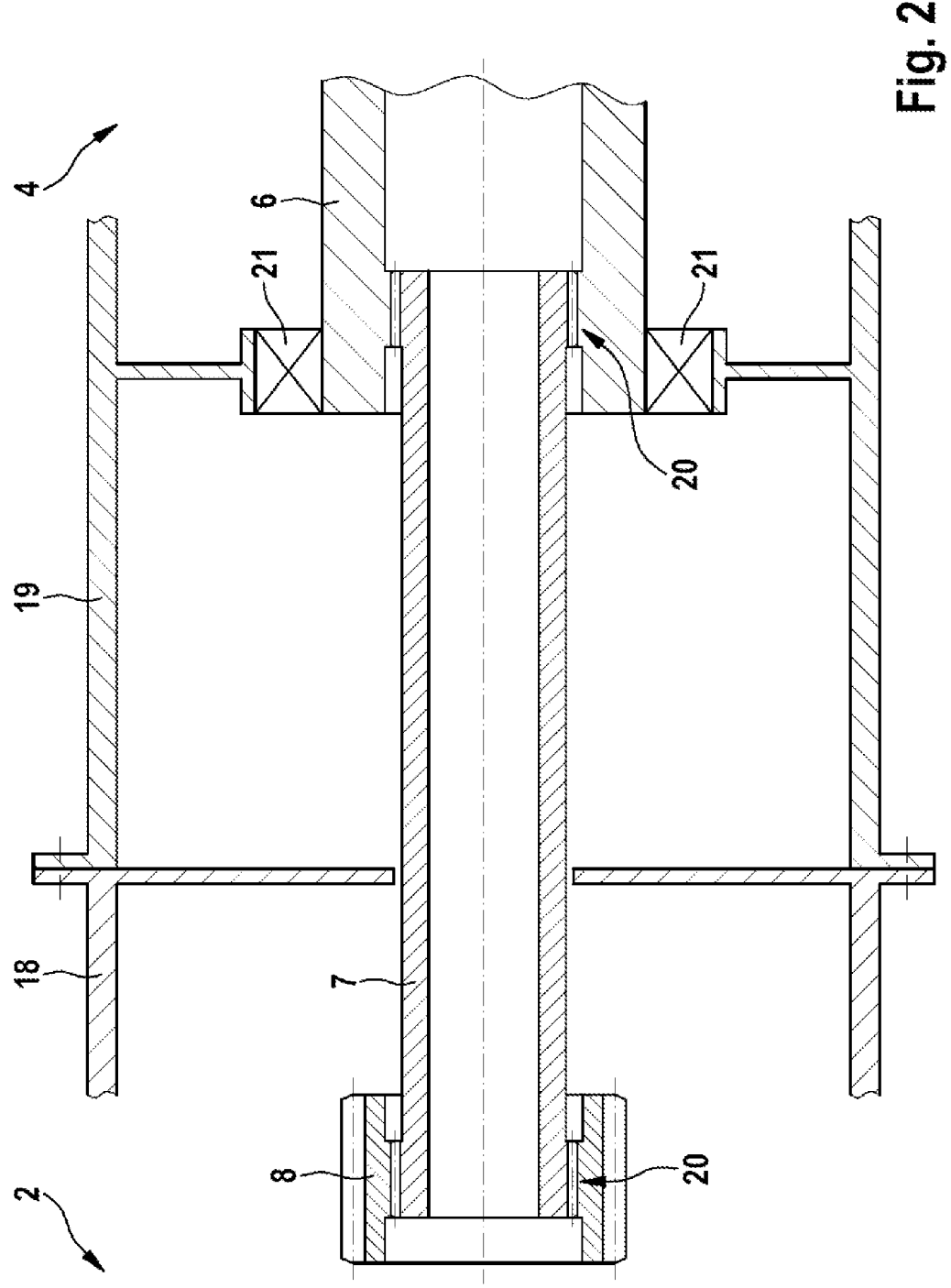
FIG. 2 shows a schematic longitudinal section through the coupling means according to the disclosure as a transmission output shaft provided with double universal-joint support.

FIG. 2 shows a generator housing 19 of the generator 4, said housing being flanged to a transmission housing 18 of the planetary transmission 2. A transmission output shaft 7 provided with double universal-joint support serves as a coupling means between the generator shaft 6, which is supported on the generator housing 19 by means of bearings 21, and a sun wheel 8 of the planetary transmission 2. The transmission output shaft 7 thus has respective joints 20 at the sun wheel 8 and at the generator shaft 6, with the result that the sun wheel 8 serves as an articulation point on the transmission side and the generator shaft 6 serves as an articulation point on the generator side. This is the way in which compensation of axial, radial and angular misalignment between the planetary transmission 2 and the generator 4 is accomplished.

Figure 3:
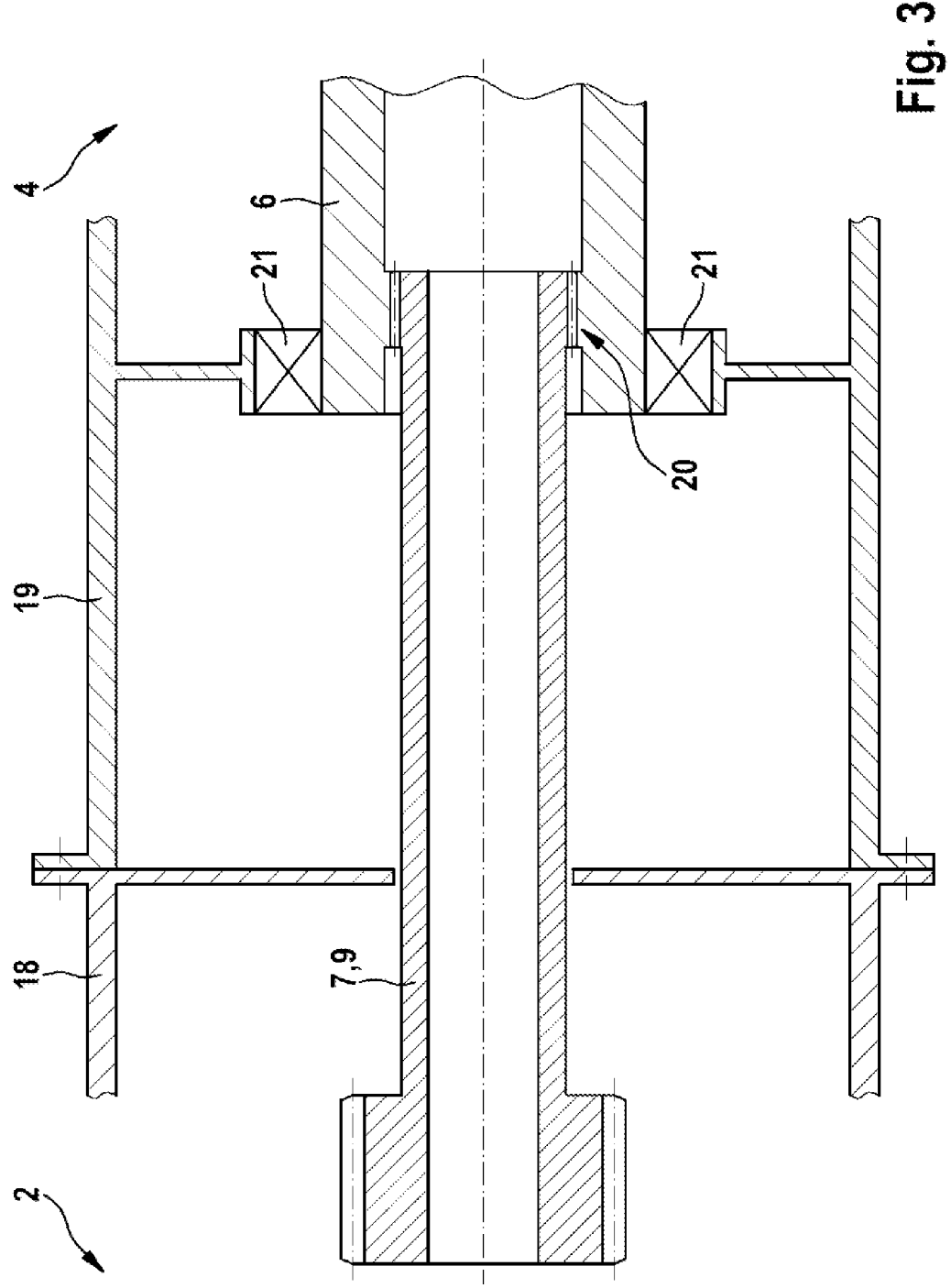
FIG. 3 shows a schematic longitudinal section through the coupling means according to the disclosure in accordance with a second embodiment, as a transmission output shaft provided with universal-joint support on the generator side.

According to FIG. 3, the compensation of axial, radial and angular misalignment between the planetary transmission 2 and the generator 4 is accomplished by means of a transmission output shaft 7, which is arranged between the planetary transmission 2 and the generator shaft 6, is configured as a sun wheel shaft 9 and is provided with universal-joint support on the generator side. The transmission output shaft 7 thus has only one joint 20, which is arranged on the inner circumferential surface of the generator shaft 6. The transmission output shaft 7 furthermore has a corresponding length, with the result that the radial misalignment is compensated by the angular misalignment, and the axial misalignment is compensated by the universal-joint support.

In FIG. 4, the coupling means is arranged on the generator side on the transmission output shaft 7. Moreover, the transmission output shaft 7, configured as a sun wheel shaft 9, is arranged between the planetary transmission 2 and the generator shaft 6. That end of the sun wheel shaft 9 which faces the generator is configured as a coupling flange 13. A double-jointed coupling 10 is arranged as a coupling means on the end face of the coupling flange 13. The arrangement of a toothed coupling 11 and/or of a link-type coupling 12 in the same position would likewise be possible. A seal element 22, which seals off the generator 4 from the transmission 2 in an oil-tight manner, is arranged radially between an outer circumference of the sun wheel shaft 9 and the transmission housing 18.

It should be noted that features which have been described with reference to one of the above illustrative embodiments can also be used in combination with other features or steps of other illustrative embodiments described above. Reference signs are not to be regarded as restrictive.

LIST OF REFERENCE SIGNS

1 wind power plant
2 planetary transmission
3 rotor
4 generator
5 transmission input shaft
6 generator shaft
7 transmission output shaft
8 sun wheel
9 sun wheel shaft
10 double-jointed coupling
11 toothed coupling
12 link-type coupling
13 coupling flange
14 tower
15 pod
16 hub
17 rotor blades
18 transmission housing
19 generator housing
20 joint
21 bearing
22 seal element

What is claimed is:

1. A wind power plant, comprising:
a rotor;
an integrated medium-speed electric generator that includes a generator shaft;
a planetary transmission that includes:
a transmission input shaft connected indirectly to the rotor; and
a transmission output shaft;
the planetary transmission being configured to convert a slow rotary motion of the rotor into a rapid rotary motion of the transmission output shaft; and
a coupling mechanism that at least couples the transmission output shaft to the generator shaft so that the generator shaft rotates along with the transmission output shaft for driving the generator, and that is configured to compensate axial, radial and angular misalignment between the planetary transmission and the generator shaft.

2. The wind power plant according to claim 1, wherein:
the coupling mechanism includes a first universal joint support that couples the transmission output shaft with a sun wheel of the planetary transmission, and a second universal joint support that couples the transmission output shaft with the generator shaft, so that the transmission output shaft has double universal joint support.

3. The wind power plant according to claim 1, wherein:
the transmission output shaft is configured as a sun wheel shaft, and
the coupling mechanism includes a universal joint support that couples a generator side of the transmission output shaft with the generator shaft.

4. The wind power plant according to claim 1, wherein:
the transmission output shaft is configured as a sun wheel shaft; and
the coupling mechanism includes a coupling member positioned on a generator side of the transmission output shaft, the coupling member coupling the transmission output shaft with the generator shaft.

5. The wind power plant according to claim 4, wherein the generator-side coupling member includes at least one of: at least one dual-plate coupling; at least one toothed coupling; and at least one link-type coupling.

6. The wind power plant according to claim 4, wherein:
the generator-side coupling member is flanged to the sun wheel shaft, and
a positive or nonpositive joint is provided between the flanged-on coupling member and the sun wheel shaft.

7. The wind power plant according to claim 6, wherein, when the joint between the flanged-on coupling member and the sun wheel shaft is nonpositive, and a mechanism configured to increase a friction coefficient is provided axially on end faces of the joint.

8. The wind power plant according to claim 4, wherein a generator-side coupling flange is forged directly on the sun wheel shaft.

9. A wind power plant, comprising:
a rotor;
an integrated medium-speed electric generator that includes a generator shaft;
a planetary transmission that includes:
a transmission input shaft connected indirectly to the rotor; and
a transmission output shaft;
the planetary transmission being configured to convert a slow rotary motion of the rotor into a rapid rotary motion of the transmission output shaft;
a coupling mechanism that at least couples the transmission output shaft to the generator shaft so that the generator shaft rotates along with the transmission output shaft for driving the generator, and that is configured to compensate axial, radial and angular misalignment between the planetary transmission and the generator shaft; and
a seal element configured to seal off the planetary transmission in an oil-tight manner from the generator,
wherein the coupling mechanism is configured to receive transmission oil to lubricate and cool the coupling mechanism.

10. A wind power plant, comprising:
a rotor;
an integrated medium-speed electric generator that includes a generator shaft;
a planetary transmission that includes:
a transmission input shaft connected indirectly to the rotor; and
a transmission output shaft;
the planetary transmission being configured to convert a slow rotary motion of the rotor into a rapid rotary motion of the transmission output shaft; and
a coupling mechanism that at least couples the transmission output shaft to the generator shaft so that the generator shaft rotates along with the transmission output shaft for driving the generator, and that is configured to compensate axial, radial and angular misalignment between the planetary transmission and the generator shaft;
wherein the coupling mechanism has a current-insulating effect or has a mechanism that has a current-insulating effect.

* * * * *